(12) United States Patent
Chambers

(10) Patent No.: US 10,655,928 B2
(45) Date of Patent: May 19, 2020

(54) INTEGRATED RECHARGEABLE POWER AND POWER MANAGEMENT TECHNOLOGY FOR INDIVIDUAL WEAPON MOUNTED ELECTRONIC DEVICES

(71) Applicant: Christopher M. Chambers, Oviedo, FL (US)

(72) Inventor: Christopher M. Chambers, Oviedo, FL (US)

(73) Assignee: Serious Simulations, LLC, Orlando, FL (US)

( * ) Notice: Subject to any disclaimer, the term of this patent is extended or adjusted under 35 U.S.C. 154(b) by 0 days.

(21) Appl. No.: 16/005,285

(22) Filed: Jun. 11, 2018

(65) Prior Publication Data

US 2018/0356184 A1    Dec. 13, 2018

Related U.S. Application Data

(60) Provisional application No. 62/517,903, filed on Jun. 10, 2017.

(51) Int. Cl.
| | | |
|---|---|---|
| *F41A 19/00* | (2006.01) | |
| *F41C 23/22* | (2006.01) | |
| *F41C 23/20* | (2006.01) | |
| *H02J 7/00* | (2006.01) | |

(Continued)

(52) U.S. Cl.
CPC ............. *F41C 23/22* (2013.01); *F41C 23/20* (2013.01); *F41C 27/00* (2013.01); *H02J 7/00* (2013.01); *H02J 7/0063* (2013.01); *H02J 7/0014* (2013.01); *H02J 7/0029* (2013.01); *H02J 7/0047* (2013.01); *H02J 7/02* (2013.01); *H02J 2007/005* (2013.01)

(58) Field of Classification Search
CPC .......... F41C 23/04; F41C 23/14; F41C 23/22; F41C 27/00
See application file for complete search history.

(56) References Cited

U.S. PATENT DOCUMENTS

| 1,583,616 | A | * | 5/1926 | Smith | ................... F41C 23/00 |
|---|---|---|---|---|---|
| | | | | | 42/75.03 |
| 2,027,416 | A | * | 1/1936 | Blakeslee | ............ H05B 3/0004 |
| | | | | | 219/50 |

(Continued)

FOREIGN PATENT DOCUMENTS

WO    WO-2007053614 A2 *    5/2007    ............. F41C 23/22

*Primary Examiner* — Gabriel J. Klein
(74) *Attorney, Agent, or Firm* — Maxwell L. Minch; Maxwell L. Minch Esq. PA

(57) ABSTRACT

The present invention provides for devices and methods for making and using an integrated rechargeable power supply and power management system for providing power to weapon mounted electronic devices. The inventive apparatus provides for a common power source for weapon attachments, that can be integrated into a weapon. These devices and methods provide for an easy swap of the power source in an active environment, and further includes power management and safety functions. The inventive devices and methods further provide for better ergonomics and improved weight/balance to enhance shooting skills, less physically taxing heft, and potentially save lives. Finally, the present invention is backwards compatible with present weapons.

6 Claims, 2 Drawing Sheets

(51) Int. Cl.
*F41C 27/00* (2006.01)
*H02J 7/02* (2016.01)

(56) References Cited

U.S. PATENT DOCUMENTS

| | | | | |
|---|---|---|---|---|
| 2,187,640 | A * | 1/1940 | Bost | F41C 23/00 42/75.03 |
| 4,000,403 | A * | 12/1976 | Rice | F21V 33/008 362/370 |
| 4,069,414 | A * | 1/1978 | Bell | F21L 14/00 362/110 |
| 4,829,692 | A * | 5/1989 | Guild | F41A 17/00 340/540 |
| 9,109,855 | B1 * | 8/2015 | Kincel | F41C 23/20 |
| 9,200,867 | B1 * | 12/2015 | Swan | F41G 11/003 |
| 9,383,167 | B1 * | 7/2016 | Connolly | F41G 11/003 |
| 9,404,708 | B1 * | 8/2016 | Chow | F41C 23/06 |
| 9,472,971 | B2 * | 10/2016 | Soar | F41G 11/00 |
| 2010/0192446 | A1 * | 8/2010 | Darian | F41C 23/22 42/84 |
| 2011/0173863 | A1 * | 7/2011 | Ingram | F41A 11/00 42/73 |
| 2011/0283585 | A1 * | 11/2011 | Cabahug | F41C 23/22 42/73 |
| 2012/0000109 | A1 * | 1/2012 | Zusman | F41C 23/14 42/71.01 |
| 2012/0131840 | A1 * | 5/2012 | Toole | F41G 1/35 42/114 |
| 2013/0185978 | A1 * | 7/2013 | Dodd | F41G 11/003 42/84 |
| 2014/0214106 | A1 * | 7/2014 | Wu | A61N 1/3968 607/5 |
| 2016/0377383 | A1 * | 12/2016 | Downing | F41G 11/003 42/111 |
| 2017/0155269 | A1 * | 6/2017 | Swift | H02J 50/12 |

* cited by examiner

INTEGRATED RECHARGEABLE POWER AND POWER MANAGEMENT TECHNOLOGY FOR INDIVIDUAL WEAPON MOUNTED ELECTRONIC DEVICES

CROSS-REFERENCE TO RELATED APPLICATION

This claims priority from U.S. Provisional Application No. 62/517,903, filed Jun. 10, 2017, which is incorporated by reference herein in its entirety

FIELD OF THE INVENTION

The invention relates generally to the field of providing integrated electrical power distribution to a weapon. More particularly, this invention relates to a removable and rechargeable power supply to provide power distribution system the operation of weapon mounted electronic devices.

BACKGROUND OF THE INVENTION

Modern weaponry can be equipped with a plurality of electronic devices which aid its operator in its use, weather mission specific, improved accuracy, or to enhance vision. For example, flashlights, lasers, range finders, sighting devices, combat optics, laser designators/sights, and night vision can be typically integrated and mounted to most current weapons. Each individual device is designed in isolation by a variety of manufacturers and engineers. Each device provides its own power source, leading to unwanted and inefficient bulk, additional real estate on the rail system, weight, multiple battery inventories, multiple battery lives to be monitored individually, and redundant multiple battery compartment design expenses. The result is a heavy and imbalanced weapon and a heavier field load of batteries to accommodate the various accessories, which ultimately impacts the operators effectiveness.

The incorporation of a common power source in a weapon has been attempted, but all known methods fall short of providing an optimal common power source due to many factors such as weight imbalance, ease of removability, types and number of batteries, etc. Some solutions have attempted to install a battery compartment in existing buttstock. To change the battery an operator must open the battery compartment, remove the old battery, replace the new battery and secure the battery compartment. In an active environment, the timing of the battery swapping can be excessive. Moreover, the solutions offered presently do not distribute the weight throughout the entire buttstock of a weapon, thus creating an imbalance within the buttstock itself. Thus there remains an unmet need for a common power source, that can be integrated into a weapon, that it easy to swap in an active environment, with power management and safety functions, and better ergonomics and improved weight/balance to enhance shooting skills, less physically taxing heft, and potentially save lives. Furthermore there further remains an unmet need for such integrated common power source that is backwards compatible with present weapons.

SUMMARY OF INVENTION

The present invention provides for devices and methods of an integrated rechargeable power supply and power management system for providing power to weapon mounted electronic devices. Embodiments of the invention include the incorporation of batteries, power distribution circuits, an enclosure, a connection mechanism and a release mechanism. The inventive apparatus provides for a common power source for weapon attachments, that can be integrated into a weapon. These devices and methods provide for an easy swap of the power source in an active environment, and further includes power management and safety functions. The inventive devices and methods further provide for better ergonomics and improved weight/balance to enhance shooting skills, less physically taxing heft, and potentially save lives. Finally, the present invention is backwards compatible with present weapons.

BRIEF DESCRIPTION OF THE DRAWINGS

The present invention is further detailed with reference to the following figures. These figures are not intended to be a limitation on the scope of the invention, but rather to illustrate specific aspects of the invention.

DETAILED DESCRIPTION OF THE INVENTION

Figure 1:
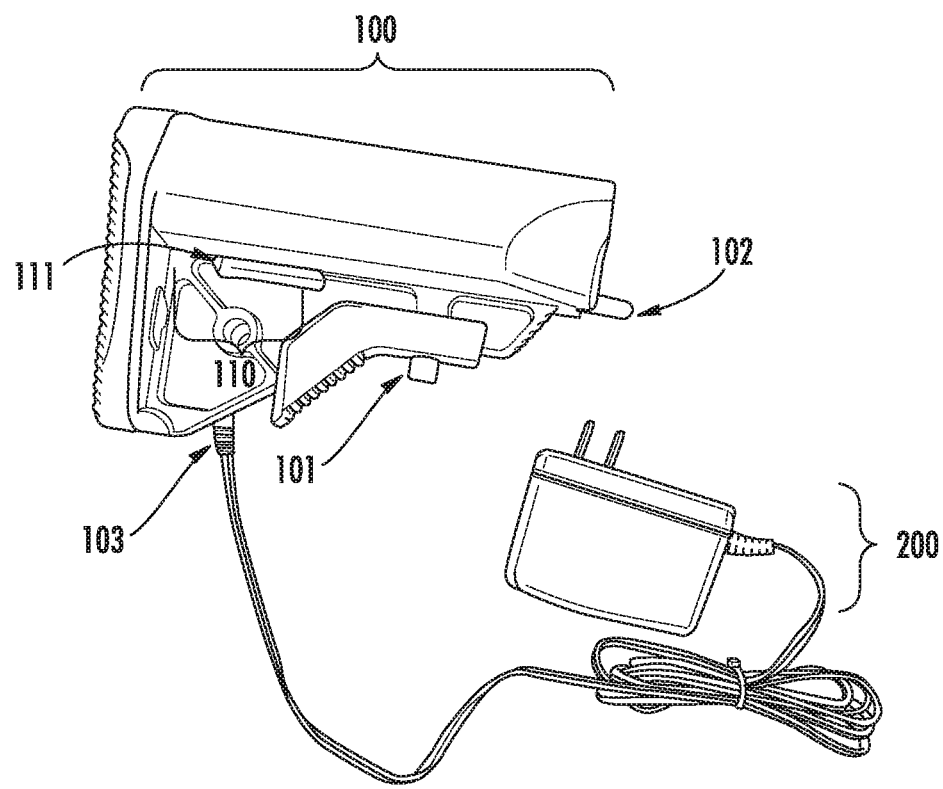
FIG. 1 provides one embodiment of the 100 inventive buttstock illustrating the 102 connection mechanism for interfacing and securing to the with the proximal end of a weapon while providing a power connector for providing power to the weapon accessories. The 101 release mechanism provides for the ability to quickly release the buttstock for hot swapping to a another, preferably fully charged, buttstock system. The 103 charging port allows for the charging of the battery buttstock. The 200 charger is one example of an available charger.
Figure 2:
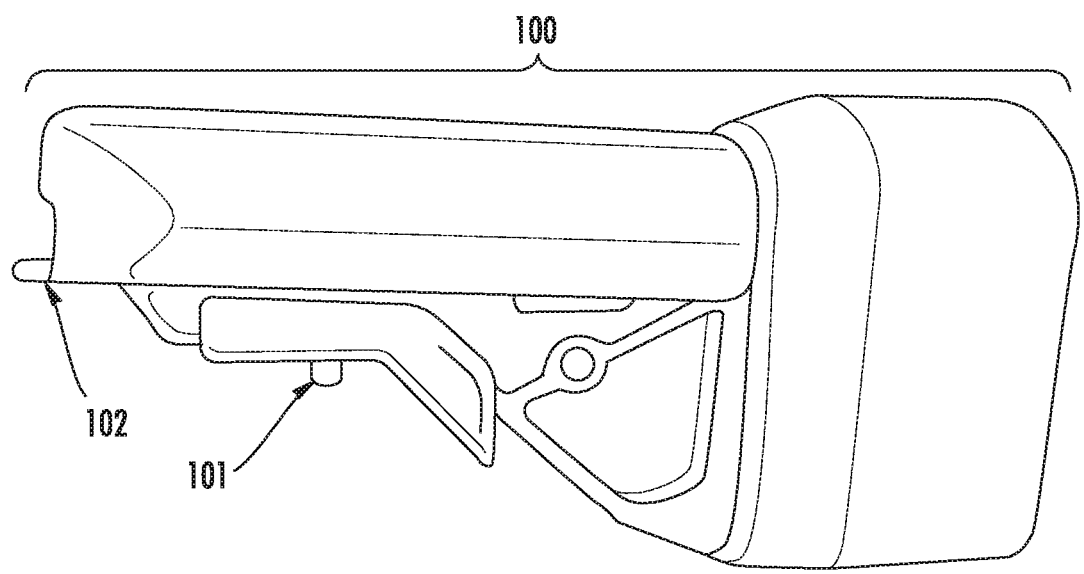
FIG. 2 is an additional embodiment of the inventive 100 buttstock system.
Figure 3:
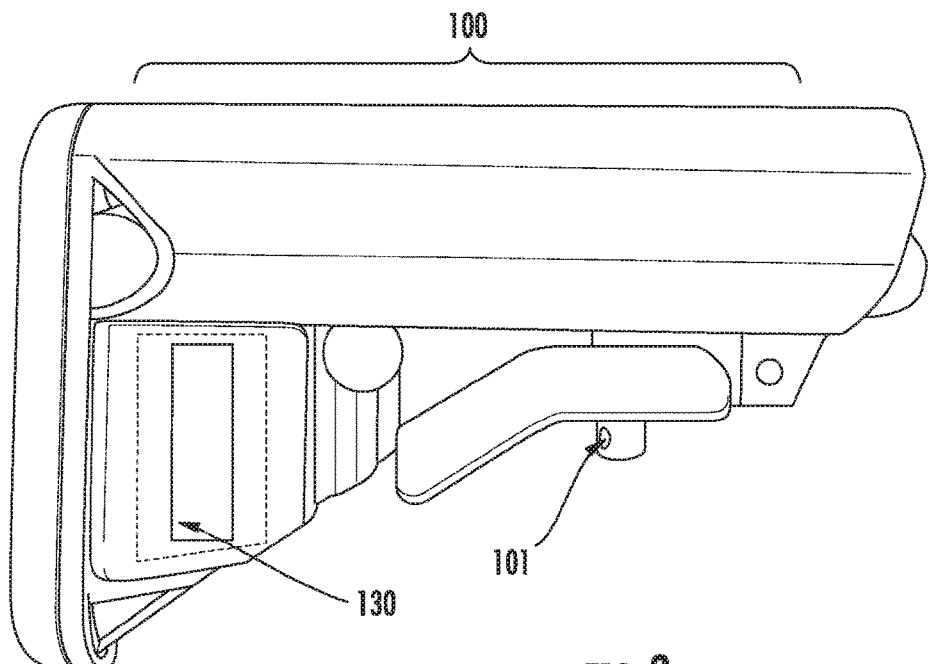
FIG. 3 illustrates at least one embodiment of the inventive buttstock having a 130 LED display for displaying the amount of charge of the batteries contained as part of the 100 buttstock system.
Figure 4:
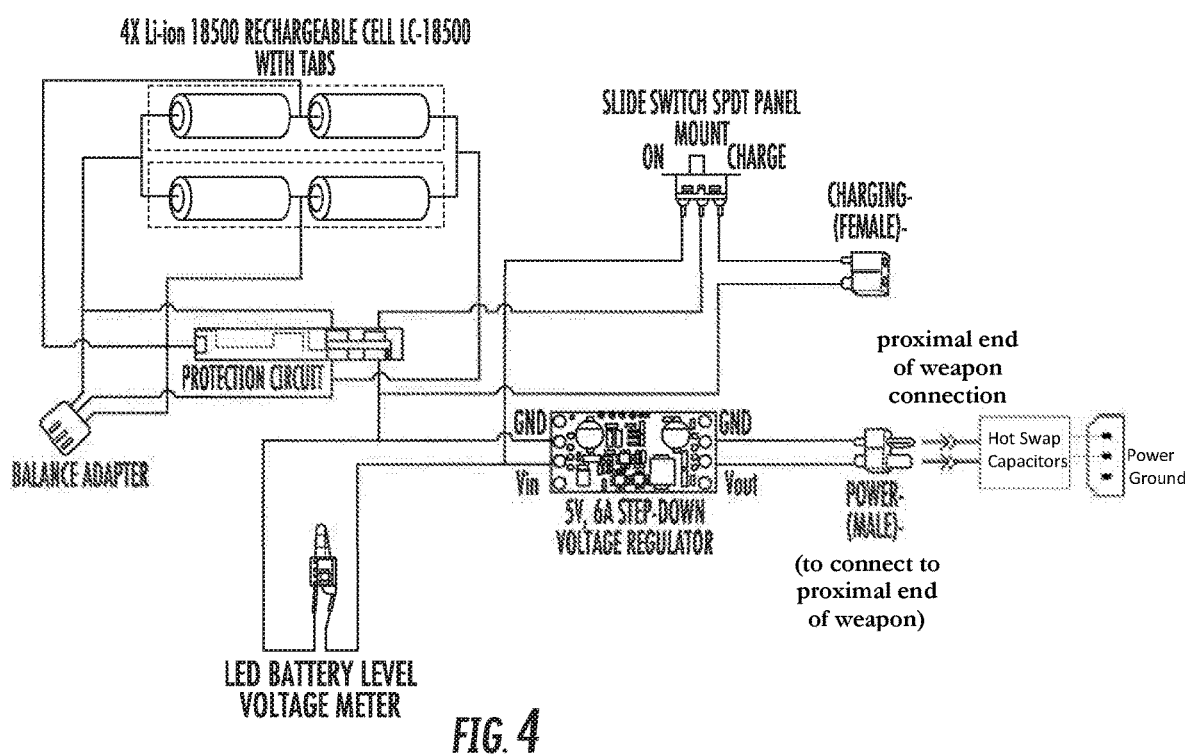
FIG. 4 illustrates at least one embodiment of a wire and component diagram of at least one embodiment of the inventive 100 buttstock system.

The present invention has utility for providing a specially made butt stock for common weapon types which is both an adjustable and removable butt stock, with and internally integrated electric power source, distribution center for power to multiple devices, and a power management and safety system. The butt stock itself is essentially a power and is easily removed with one thumb lever, exactly as the simple butt stock is currently removed. The battery butt stock has a charging port or cradle to recharge as a single unit. Individuals can carry multiple butt stock power systems and replace their power source in a few seconds without power interruption. A hot-swappable capability is provided downstream from the butt stock power unit in the form of a capacitor, such that it retains essential power to keep electronic devices running during power source switching. Other embodiments include the ability for wireless recharging of the buttstock while the inventive battery buttstock is or is not integrated with a weapon or is or is not in use.

The following detailed description is merely exemplary in nature and is in no way intended to limit the scope of the invention, its application, or uses, which may vary. The invention is described with relation to the non-limiting definitions and terminology included herein. These definitions and terminology are not designed to function as a limitation on the scope or practice of the invention, but are presented for illustrative and descriptive purposes only.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Integrated Power Buttstock

A replacement buttstock having an integrated rechargeable power supply and power management system for providing power to weapon mounted electronic devices is provided. The replacement buttstock is intended to be swapped as needed to provide power to the weapon accessories, as may be needed from time to time. In at least one embodiment, the replacement buttstock is an enclosure having at least one rechargeable battery. In at least one embodiment, the buttstock encloses a plurality of rechargeable batteries. In at least one embodiment the batteries are distributed within the buttstock enclosure to provide uniform weight distribution throughout the buttstock. Where used, even weight distribution about the buttstock prevents from the weight of the battery system internal to the buttstock from affecting the handling and weight of the weapon.

In at least one embodiment, the buttstock further encloses a power distribution circuit, a charging port which is in wired communication with the at least one battery for charging said battery, a power connector for interfacing with at least one connector for supplying power to at least one weapon mounted device, or combinations thereof. The charging port, where used, can be any charging port known in the art. The power connector, where used, can be any connector known in the art. The power distribution circuit includes a switch, a protection circuit, a voltage regulator, a balance adapter, an LED battery level voltage meter, an LED display, or combinations thereof.

It is appreciated that a novel aspect of the present invention is that the buttstock is removed and replaced when power is running low, as opposed to replacing a battery or a plurality of batteries. Swapping only the buttstock provides a tactical advantage by being able to hot swap a buttstock in a minimal number of steps, while also interfacing with existing buttstock connections. In at least one embodiment, the buttstock system includes at least one connection mechanism for connecting and securing the buttstock to the proximal end of a weapon. In at least one embodiment, the buttstock system includes at least one release mechanism for disengaging the buttstock from the proximal end of the weapon.

In at least one embodiment, the buttstock contains additional circuitry to enable wireless charging of the buttstock.

One example of an accessory for a weapon is a scope which includes a reticle which can be illuminated for use in low light or daytime conditions. Illumination is usually provided by a battery powered LED, though other electric light sources can be used. Other examples of powered accessories include, but are not limited to: tactical lights, laser aiming modules, and night vision devices.

Battery

The battery may be one or more batteries and is intended to be any battery which is designed to be rechargeable, and having enough capacity to be able to power weapon accessories for a reasonable amount of time, as may be tactically necessary. In at least one embodiment, the battery may be of lead-acid, nickel cadmium (NiCd), nickel metal hydride (NiMH), lithium ion (Li-ion), or lithium ion polymer (Li-ion polymer).

Other Embodiments

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

The foregoing description is illustrative of particular embodiments of the invention, but is not meant to be a limitation upon the practice thereof. The following claims, including all equivalents thereof, are intended to define the scope of the invention.

The invention claimed is:

1. A buttstock for use with a weapon which includes powered accessories requiring power, the buttstock comprising:
    at least one battery;
    at least one power distribution circuit, wherein said power distribution circuit includes at least one of a switch, a protection circuit, a voltage regulator, a balance adapter, an LED battery level voltage meter, an LED display, or combinations thereof;
    a capacitor at a proximal end of the weapon and electrically downstream of a power connector of said buttstock, said capacitor sufficient to retain essential power to keep electronic devices temporarily energized during buttstock swapping;
    at least one connection mechanism for connecting and securing the buttstock to the proximal end of the weapon; and at least one release mechanism for disengaging the buttstock from the proximal end of the weapon.

2. The buttstock of claim 1 further comprising a charging port which is in wired communication with the at least one battery for charging said battery.

3. The buttstock of claim 1 further comprising a power connector for interfacing with at least one connector for supplying power to at least one weapon mounted device.

4. An integrated rechargeable power supply and power management system for providing power to weapon mounted electronic devices, the system comprising:
    at least one battery;
    at least one power distribution circuit, wherein said power distribution circuit includes at least one of a switch, a protection circuit, a voltage regulator, a balance adapter, an LED battery level voltage meter, an LED display, or combinations thereof;
    a removable enclosure formed as a buttstock, said enclosure for holding said at least one battery and at least one power distribution circuit;
    a capacitor at a proximal end of the weapon and electrically downstream of a power connector of said buttstock, said capacitor sufficient to retain essential power to keep electronic devices temporarily energized during buttstock swapping;

at least one connection mechanism for connecting and securing the buttstock to the proximal end of the weapon; and at least one release mechanism for disengaging the buttstock from the proximal end of the weapon.

5. The system of claim 4 further comprising a female charging port which is in wired communication with the at least one battery for charging said battery.

6. The system of claim 4 further comprising a male power connector for interfacing with at least one connector for supplying power to at least one weapon mounted device.

* * * * *